United States Patent
Bennet et al.

(10) Patent No.: US 12,254,671 B2
(45) Date of Patent: Mar. 18, 2025

(54) USING SLAM 3D INFORMATION TO OPTIMIZE TRAINING AND USE OF DEEP NEURAL NETWORKS FOR RECOGNITION AND TRACKING OF 3D OBJECT

(71) Applicant: ARpalus LTD, Netanya (IL)

(72) Inventors: Rotem Bennet, Ein-Carmel (IL); Ofir Zilberberg, Herzlyia (IL)

(73) Assignee: ARpalus LTD., Netanya (IL)

(*) Notice: Subject to any disclaimer, the term of this patent is extended or adjusted under 35 U.S.C. 154(b) by 0 days.

(21) Appl. No.: 18/574,650

(22) PCT Filed: Jun. 28, 2022

(86) PCT No.: PCT/IL2022/050696
§ 371 (c)(1),
(2) Date: Dec. 27, 2023

(87) PCT Pub. No.: WO2023/275870
PCT Pub. Date: Jan. 5, 2023

(65) Prior Publication Data
US 2024/0212322 A1    Jun. 27, 2024

(30) Foreign Application Priority Data
Jun. 30, 2021   (IL) .......................................... 284515

(51) Int. Cl.
*G06V 10/764*    (2022.01)
*G06Q 10/087*    (2023.01)
(Continued)

(52) U.S. Cl.
CPC ......... *G06V 10/764* (2022.01); *G06Q 10/087* (2013.01); *G06T 7/11* (2017.01);
(Continued)

(58) Field of Classification Search
CPC .... G06V 10/764; G06V 10/817; G06V 20/20; G06V 20/70; G06V 10/809; G06V 10/82;
(Continued)

(56) References Cited

U.S. PATENT DOCUMENTS 10,133,933 B1 * 11/2018 Fisher .................... G06V 20/41
2007/0182555 A1 * 8/2007 Walker ................. G07G 1/0036
340/572.1
(Continued)

FOREIGN PATENT DOCUMENTS

WO   WO 2018/005369 A1    1/2018
WO   WO 2019/226686       11/2019
(Continued)

OTHER PUBLICATIONS

Kim et al. Hierarchical committee of deep convolutional neural networks for robust facial expression recognition. Journal on Multimodal User Interfaces, Jun. 2016, 10(2):173-189.
(Continued)

*Primary Examiner* — Terrell M Robinson
(74) *Attorney, Agent, or Firm* — Craig R. Miles; CR MILES P.C.

(57) ABSTRACT

A system for tracking of an inventory of products on one or more shelves includes a mobile device. The mobile device has an image sensor, at least one processor, and a non-transitory computer-readable medium having instructions that, when executed by the processor, causes the processor to: apply a simultaneous localization and mapping in three dimensions program, on images of a shelf input from the image sensor, to thereby generate a plurality of bounding boxes, each bounding box representing a three-dimensional location and boundaries of a product from the inventory; capture a plurality of two-dimensional images of the shelf; assign an identification to each product displayed in the
(Continued)

plurality of two-dimensional images using a deep neural network; associate each identified product in a respective two-dimensional image with a corresponding bounding box, and associate each bounding box with a textual identifier signifying the identified product.

33 Claims, 11 Drawing Sheets

(51) Int. Cl.
| | |
|---|---|
| G06T 7/11 | (2017.01) |
| G06T 7/579 | (2017.01) |
| G06T 7/73 | (2017.01) |
| G06T 19/00 | (2011.01) |
| G06V 10/75 | (2022.01) |
| G06V 10/774 | (2022.01) |
| G06V 10/80 | (2022.01) |
| G06V 10/82 | (2022.01) |
| G06V 20/20 | (2022.01) |
| G06V 20/70 | (2022.01) |

(52) U.S. Cl.
CPC ............... *G06T 7/579* (2017.01); *G06T 7/73* (2017.01); *G06T 19/006* (2013.01); *G06V 10/751* (2022.01); *G06V 10/774* (2022.01); *G06V 10/809* (2022.01); *G06V 10/817* (2022.01); *G06V 10/82* (2022.01); *G06V 20/20* (2022.01); *G06V 20/70* (2022.01); *G06T 2200/24* (2013.01); *G06T 2207/20084* (2013.01); *G06T 2207/20092* (2013.01); *G06T 2210/12* (2013.01)

(58) Field of Classification Search
CPC .... G06V 10/751; G06V 10/774; G06T 7/579; G06T 7/73; G06T 19/006; G06T 2200/24; G06T 2207/20084; G06T 2207/20092; G06T 2207/2008
See application file for complete search history.

(56) References Cited

U.S. PATENT DOCUMENTS

| | | |
|---|---|---|
| 2009/0059270 A1 | 3/2009 | Opalach et al. |
| 2009/0060349 A1 | 3/2009 | Linaker et al. |
| 2013/0076726 A1 | 3/2013 | Ferrara et al. |
| 2015/0248580 A1 | 9/2015 | Ferrara et al. |
| 2015/0262116 A1 | 9/2015 | Katircioglu et al. |
| 2017/0323376 A1 | 11/2017 | Glaser et al. |
| 2019/0000382 A1 | 1/2019 | Fitzpatrick |
| 2019/0073627 A1 | 3/2019 | Nakdimon et al. |
| 2019/0102686 A1 | 4/2019 | Yang et al. |
| 2019/0130214 A1 | 5/2019 | N et al. |
| 2019/0156277 A1 | 5/2019 | Fisher et al. |
| 2019/0213212 A1 | 7/2019 | Adato et al. |
| 2019/0236526 A1 | 8/2019 | Sosna |
| 2020/0118064 A1* | 4/2020 | Perrella ............... G06F 16/2246 |
| 2020/0387854 A1 | 12/2020 | Mustafi et al. |
| 2021/0090022 A1* | 3/2021 | Wei ..................... G06Q 10/0875 |
| 2022/0188760 A1* | 6/2022 | Fisher ..................... H04N 23/60 |
| 2022/0303445 A1* | 9/2022 | Skaff ..................... H04N 23/57 |

FOREIGN PATENT DOCUMENTS

| | | |
|---|---|---|
| WO | WO 2020/210825 A1 | 10/2020 |
| WO | WO 2021/034681 | 2/2021 |
| WO | WO 2014/063157 A2 | 4/2023 |

OTHER PUBLICATIONS

Geng et al. Fine-grained grocery product recognition by one-shot learning. Proceedings of the 26th ACM international conference on Multimedia, Oct. 2018, pp. 1706-1714.

Fuchs et al. Towards identification of packaged products via computer vision: Convolutional neural networks for object detection and image classification in retail environments. Proceedings of the 9th International Conference on the Internet of Things. Oct. 2019, 8 pages.

PCT International Patent Application No. PCT/IL2022/050696, International Search Report and Written Opinion of the International Searching Authority dated Sep. 29, 2022, 10 pages.

Corresponding European Patent Application No. 22832342, Extended European Search Report dated Sep. 17, 2024, 12 pages.

* cited by examiner

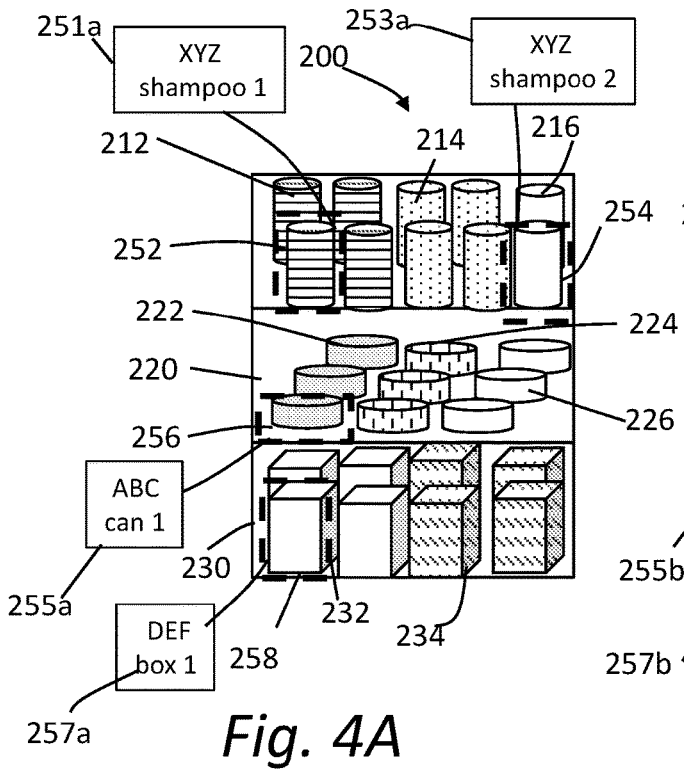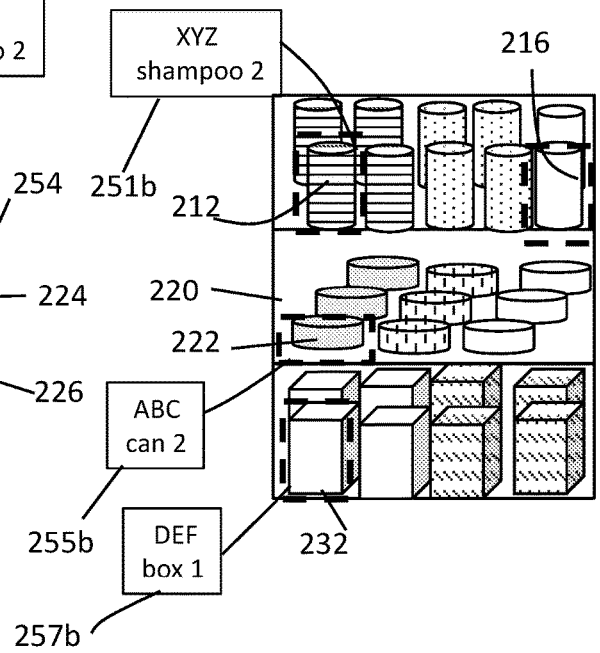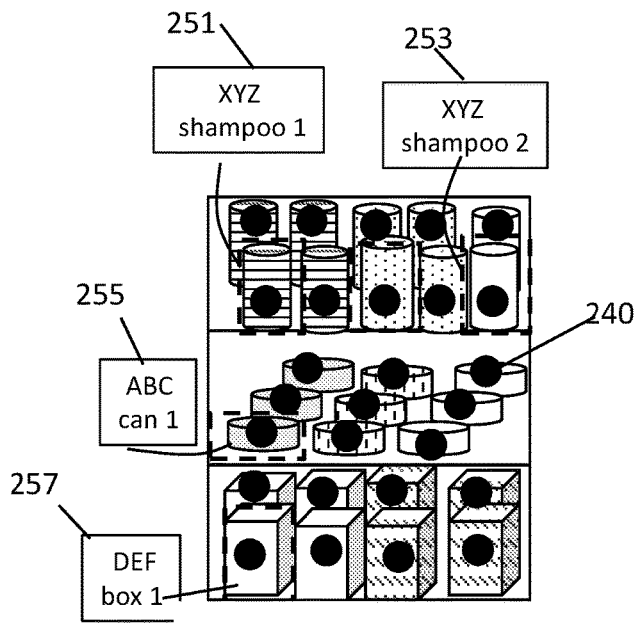
Fig. 4A
Fig. 4B
Fig. 4C

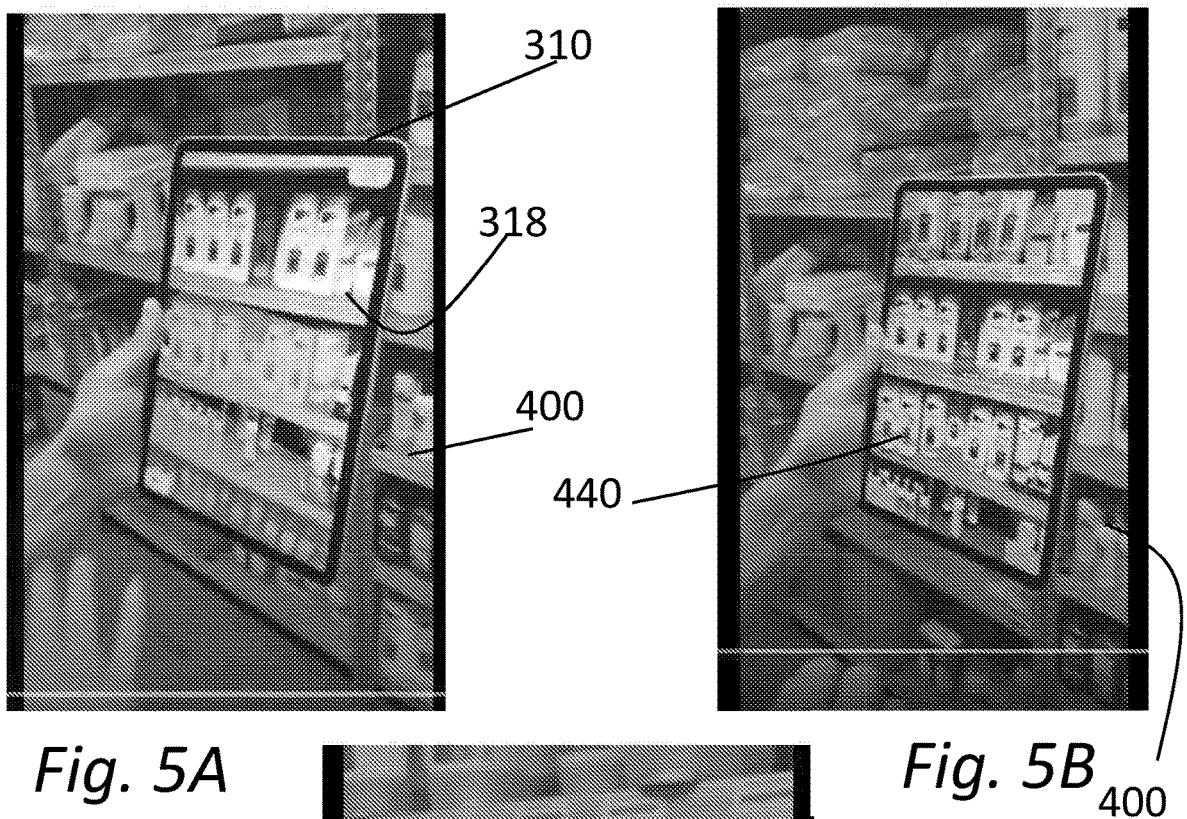
Fig. 5A
Fig. 5B
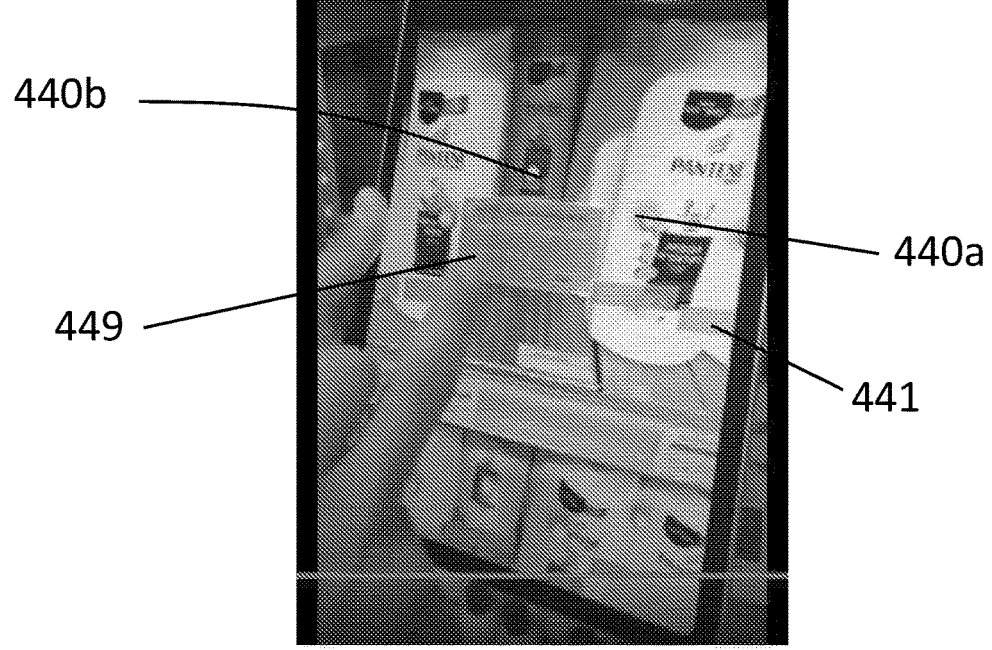
Fig. 5C

USING SLAM 3D INFORMATION TO OPTIMIZE TRAINING AND USE OF DEEP NEURAL NETWORKS FOR RECOGNITION AND TRACKING OF 3D OBJECT

RELATED APPLICATIONS

This application claims the benefit of priority of Israeli Patent Application No. 284515, filed Jun. 30, 2021, entitled "Using Slam 3D Information to Optimize Training and use of Deep Neural Networks For Recognition and Tracking of 3D Objects," the contents of which are incorporated by reference as if fully set forth herein.

FIELD OF THE INVENTION

The present disclosure, in some embodiments, concerns systems and methods for inventory management, and more specifically, but not exclusively, to a system applying simultaneous localization and mapping in three dimensions (SLAM 3D) to optimize the training and use of deep neural networks for the identification of products and other 3D objects.

BACKGROUND OF THE INVENTION

Retail stores face a continual challenge of ensuring that their inventories are properly stocked and best arranged to maximize sales. It is estimated that lost sales due to misplaced or out of stock inventory amount to approximately $1.8 trillion per year.

To address this problem, products in retail stores are organized according to planograms. A planogram is a diagram or model that indicates the placement of retail products on shelves in order to maximize sales. Retail establishments use planograms to ensure that the most popular and profitable products are given the right amount of facings and allocations. In order to be effective, planograms must be implemented properly. To achieve this end, it is necessary to check shelf spaces regularly, to ensure that the inventories correspond with the planogram and are properly stocked.

A number of methods for checking store inventories are currently in use. The historical, low-tech approach is to check the shelves manually. However, manual checking is labor-intensive and error-prone. Another approach is to install permanent cameras facing the shelves. However, such cameras are expensive, complex to implement, and potentially intrusive to customers. Recently, monitoring planogram compliance has been proposed using images captured by mobile devices. To date, however, such techniques require uploading images from the mobile devices to a central computer for processing, and in most cases also require a manual review of the computer-generated results before sending back to the user. This process causes a significant delay between imaging and taking of corrective action, resulting in potential lost sales.

Machine learning is commonly used to detect objects within images. Object detection consists of two processes: Object localization, which refers to identifying the location of one or more objects in an image and drawing a bounding box around their borders within the images, and image classification, which refers to determining the identity of an object pictured within a bounding box. Numerous architectures have been developed for performing these machine learning tasks, including pattern matching, deep neural networks and convolutional neural networks.

Simultaneous Localization and Mapping in Three Dimensions (SLAM 3D) is a recently developed computational technique for constructing a three-dimensional map of an area while also tracking the location of the physical camera with respect to the mapped scene, which consequently enables localizing the captured objects within that area. SLAM 3D technology forms the basis of augmented reality.

SUMMARY OF THE INVENTION

The present disclosure describes a revolutionary approach for improving the use and training of deep neural networks with SLAM 3D marking. Existing deep neural networks are able to evaluate single images of an object or a video in which the object is continuously visible and can be tracked. There is no improvement in the operation of the deep neural network based on taking multiple images of the same scene without being able to consistently track and connect the appearances of the same object in those different images. By contrast, in embodiments of the present disclosure, multiple images are captured of the same object from different perspectives, with each object in the image being associated with a particular SLAM 3D marking. The results of application of a deep neural network on each image are aggregated, and a decision analysis, e.g. voting, is conducted on the resulting identification. As a result, the accuracy of the identification increases, even when less robust deep neural networks are used, because the cumulative application of all of the deep neural networks is more accurate than a single deep neural network.

In addition, existing technologies for training deep neural networks rely on training images that are previously generated. Any update to the group of images used to train the network must proceed "off-line." By contrast, in embodiments of the present disclosure, during operation of the network, the deep neural network continuously receives new images having ground truth values for the objects therein identified. These new images with the included ground truths may be incorporated into the training of the deep neural network, so as to continually improve the ability of the network to identify imaged objects.

In particular, according to embodiments of the present disclosure, SLAM 3D marking is used to generate a persistent label of a three-dimensional location of each imaged object. The deep neural network identifies the objects in the image, and a program within the mobile device also applies 3D markings corresponding to each object. The program persistently maintains the 3D markings, even as the image sensor is moved in three dimensions. As a result, additional views are generated of the objects, with the identity of the objects already known. These additional views are used to further train the deep neural network, so as to improve the capacity of the deep neural network to classify the object.

This novel approach is particularly well suited to tracking inventory in retail stores. Using the described combination of SLAM 3D marking and image recognition, a mobile device may capture a three-dimensional view of a particular shelf at a particular time, and then, after returning to the shelf, compare the current status of products on the shelf to the original status. This comparison is made to the locations of products as indicated by the SLAM 3D markers generated on the device. As a result, the comparison may be performed instantaneously, on the mobile device itself, as an edge computing process. The results may be continuously updated in real time. Following generation of the comparison, the user may be prompted to correct the current status of the shelf to bring it into compliance with the original status, such as by organizing the shelf or by ordering new products. As a result, the identification of products is performed with a high degree of accuracy, and the identification of action items for maintaining the shelf in compliance may be performed quickly and efficiently, as an edge computing process.

According to a first aspect, a system for tracking an inventory of products on one or more shelves is disclosed. The system comprises a mobile device including an image sensor, at least one processor, and a non-transitory computer-readable medium having instructions that, when executed by the processor, causes the processor to perform the following steps: apply a simultaneous localization and mapping in three dimensions (SLAM 3D) program, on images of a shelf input from the image sensor, to thereby generate a plurality of bounding boxes, each bounding box representing a three-dimensional location and boundaries of a product from the inventory; capture a plurality of two-dimensional images of the shelf; assign an identification to each product displayed in the plurality of two-dimensional images using a deep neural network; associate each identified product in a respective two-dimensional image with a corresponding bounding box, and associate each bounding box with a textual identifier signifying the identified product.

Optionally, the processor is further configured to: apply the deep neural network on a plurality of images of the shelf captured from different angles, to thereby generate a plurality of identifications of products associated with each bounding box; aggregate the plurality of identifications associated with each bounding box; and output the textual identifier of each bounding box based on a voting analysis applied to the aggregated identifications.

In another implementation according to the first aspect, the processor is further configured to continuously update the voting analysis as additional images of the shelf are captured from different angles.

In another implementation according to the first aspect, the deep neural network is a hierarchical system of multiple neural networks running dependently in a sequence.

Optionally, the hierarchical system of multiple neural networks includes: a first level for identifying a shelf or a category of product; a second level for identifying a brand; and a third level for identifying a specific product.

Optionally, the mobile device comprises a long-term memory for storing each hierarchical deep neural network for each shelf on a floor plan, and the processor is further configured to upload deep neural network levels for identification of products on a particular shelf to a short-term memory of the mobile device in advance of imaging of said shelf, so that the identification is performed solely as an edge computing process.

In another implementation according to the first aspect, the processor is further configured to apply a textual identification of a bounding box onto a corresponding image of the product associated with the bounding box in which the deep neural network was unable to identify said product.

Optionally, the processor is further configured to update training of the deep neural network based on product identifications in the corresponding image.

Optionally, the processor is further configured to receive a user-generated identification of a product within a particular image; and apply said user-generated identification to instances of said product in additional two-dimensional images.

In another implementation according to the first aspect, the processor is further configured to maintain persistent identification of products within discrete regions of a three-dimensional scene, in real time, as the image sensor changes its vantage point relative to the shelf.

Optionally, the mobile device further comprises a screen, wherein the system is configured to display on the screen a holographic projection overlaying each product on the shelf, said holographic projection remaining visible on an image of each product regardless of an angle at which each product is viewed.

In another implementation according to the first aspect, the processor is configured to identify a product based on a bar code printed on a packaging of the product.

In another implementation according to the first aspect, the memory further comprises a floor plan encompassing a plurality of shelves, and the processor is configured to identify a shelf imaged with the image sensor from among the plurality of shelves of the floor plan.

Optionally, the processor is further configured to provide instructions regarding how to reach a selected location on the floor plan, based on the processor's identification of a current shelf location and the floor plan.

In another implementation according to the first aspect, the processor is further configured to monitor changes in the inventory over each shelf based on a comparison of the bounding boxes with either a memorized scene of three-dimensional bounding-boxes taken at a prior time or with a planogram previously uploaded to the mobile device.

Optionally, the mobile device comprises a screen, and is further configured to display on the screen, at least one of (1) a status of the products of the shelf; (2) a recommendation to correct placement of products on the shelf, and (3) a recommendation to place additional products on the shelf.

Optionally, the system is configured to determine a recommendation to correct placement of products on the shelf based on a sequence alignment algorithm.

Optionally, the mobile device is further configured to display on the screen a graphical user interface including a button that, when selected, enables a user to place an order for new products.

In another implementation according to the first aspect, the system further comprises a central physical or cloud-based computing system, wherein each mobile device is configured to communicate information about a present status of the shelf to the central computing system.

According to a second aspect, a method of tracking an inventory of products on one or more shelves is disclosed. The method includes the following steps performed on a mobile device: applying a simultaneous localization and mapping in three dimensions (SLAM 3D) program on images of a shelf, to thereby generate a plurality of bounding boxes, each bounding box representing a three-dimensional location and boundaries of a product from the inventory; capturing a plurality of two-dimensional images of the shelf; assigning an identification to each product displayed in the plurality of two-dimensional images using a deep neural network; associating each identified product in a respective two-dimensional image with a corresponding bounding box; and associating each bounding box with a textual identifier signifying the identified product.

In another implementation according to the second aspect, the method further includes applying the deep neural network on a plurality of images of the shelf captured from different angles, thereby generating a plurality of identifications of products associated with each bounding box; aggregating the plurality of identifications associated with each bounding box; and outputting the textual identifier of each bounding box based on a voting analysis applied to the aggregated identifications.

Optionally, the method further includes continuously updating the voting analysis as additional images of the shelf are captured from different angles.

In another implementation according to the second aspect, the deep neural network is a hierarchical system of multiple neural networks running dependently in a sequence.

Optionally, the hierarchical system of deep neural networks includes a first level for identifying a shelf or a category of product, a second level for identifying a brand, and a third level for identifying a specific product.

In another implementation according to the second aspect, the method further includes storing on a long-term memory of the mobile device each hierarchical deep neural network for each shelf on a floor plan, and uploading, from the long-term memory of the mobile device to a short term-memory of the mobile device, deep neural network levels for identification of products on a particular shelf in advance of imaging of said shelf, so that the identifying step is performed solely as an edge computing process.

In another implementation according to the second aspect, the method further includes applying a textual identifier of a bounding box onto a corresponding image of the product associated with the bounding box in which the deep neural network was unable to identify said product.

Optionally, the method further includes updating training of the deep neural network based on product identifications in the corresponding image.

Optionally, the method further includes receiving a user-generated identification of a product within a particular image, and applying said user-generated identification to instances of said product in additional two-dimensional images.

In another implementation according to the second aspect, the method further includes maintaining persistent identification of products within discrete regions of a three-dimensional scene, in real time, while changing a vantage point of an image sensor of the mobile device relative to the shelf.

Optionally, the method further includes displaying on a screen of the mobile device a holographic projection overlaying each product on the shelf, and maintaining said holographic projection visible on an image of each product regardless of an angle at which each product is viewed.

In another implementation according to the second aspect, the method further includes identifying a product contained within each region based on a bar code printed on a packaging of the product.

In another implementation according to the second aspect, the method further includes identifying an imaged shelf from among a plurality of shelves encompassed in a floor plan.

Optionally, the method further includes providing instructions regarding how to reach a selected location on the floor plan, based on an identification of a current shelf location and the floor plan.

In another implementation according to the second aspect, the method further includes monitoring changes in the inventory over each shelf based on a comparison of the bounding boxes with either a memorized scene of three-dimensional bounding boxes taken at a prior time or with a planogram previously uploaded to the mobile device.

Optionally, the method further includes displaying on a screen of the mobile device at least one of (1) a status of the products of the shelf; (2) a recommendation to correct placement of products on the shelf, and (3) a recommendation to place additional products on the shelf.

Optionally, the method further includes determining a recommendation to correct placement of products on a shelf based on a sequence alignment algorithm.

Optionally, the method further includes displaying on the screen a graphical user interface including a button that, when selected, enables a user to place an order for new products.

In another implementation according to the second aspect, the method further includes communicating information about a present status of the shelf to a central physical or cloud-based computing system.

BRIEF DESCRIPTION OF THE DRAWINGS

In the drawings:

FIGS. 4A-4C schematically depict a process of object identification from a plurality of two-dimensional images, according to embodiments of the present disclosure;

FIG. 5A depicts a mobile device scanning a shelf and displaying products from the shelf on a screen, according to embodiments of the present disclosure;

FIG. 5B depicts a display of the mobile device showing augmented reality markers overlaid on each product from the shelf of FIG. 5A, according to embodiments of the present disclosure;

FIG. 5C depicts a display of the mobile device displaying a textual identifier corresponding to each product in the shelf of FIG. 5A, according to embodiments of the present disclosure;

DETAILED DESCRIPTION OF THE INVENTION

The present disclosure, in some embodiments, concerns systems and methods for inventory management, and more specifically, but not exclusively, to a system applying simultaneous localization and mapping in three dimensions (SLAM 3D) to optimize the training and use of deep neural networks for the identification of products.

The examples depicted below illustrate applications of the systems and methods to tracking inventory of products in a retail establishment, such as dry foods and toiletries. However, the process depicted herein is potentially applicable to tracking of any objects that remain substantially stationary for long periods of time, but whose extent or position may change gradually over time. Examples of such applications include, but are not limited to, tracking inventory materials for a factory stored in a warehouse, or tracking progress of crops growing in a greenhouse.

Figure 1:
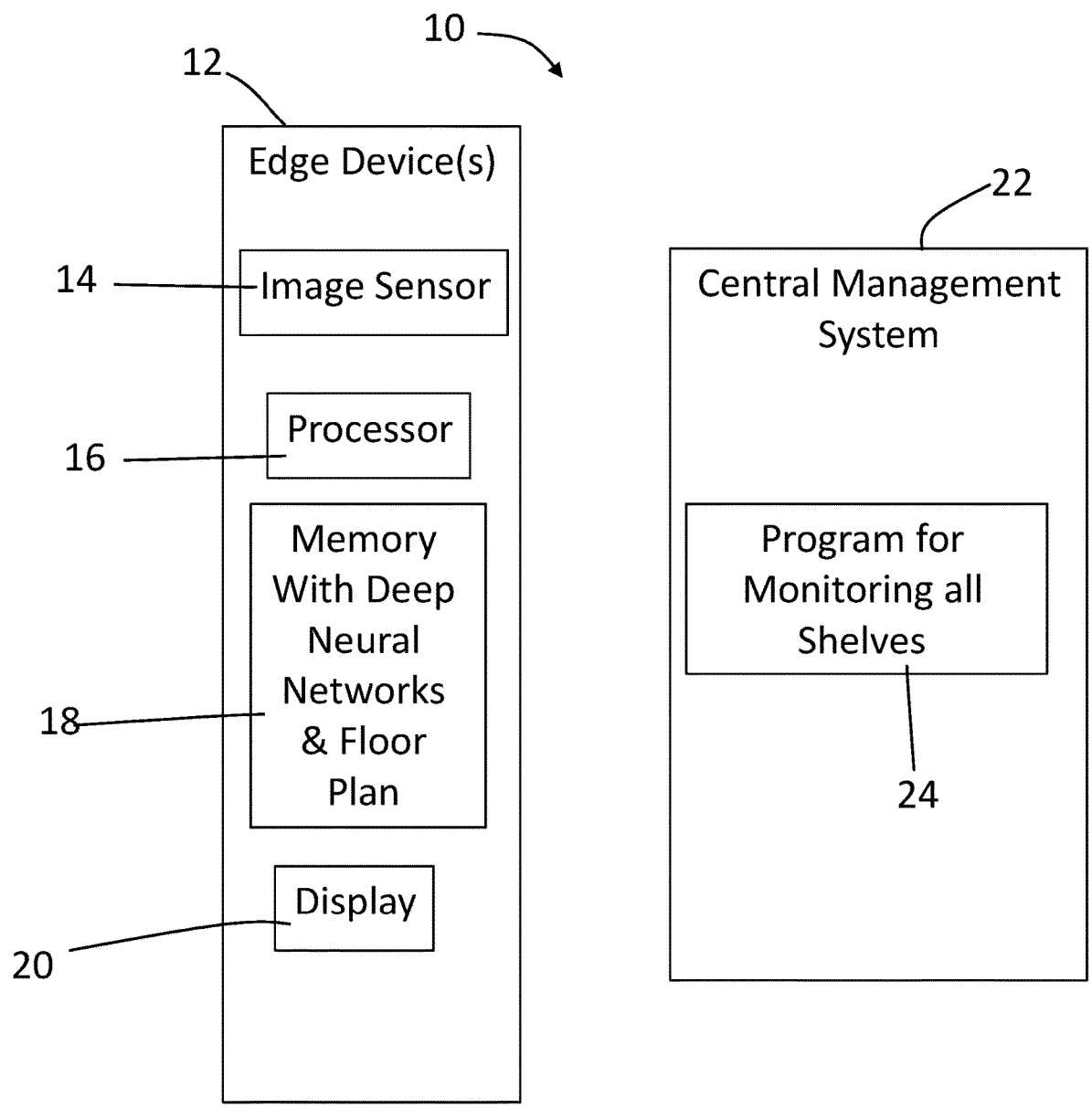
FIG. 1 depicts a schematic block diagram of a system for tracking retail inventory, according to embodiments of the present disclosure.

Referring now to FIG. 1, system 10 for inventory management includes at least one mobile device 12. Mobile device 12 may be a handheld electronic device such as a tablet computer or a mobile phone. Mobile device 12 may be, in alternative embodiments, AR glasses, a drone, a robot, or, in general, any device that is capable of moving or being moved around a 3D scene.

Mobile device 12 is also referred to herein as an edge computing device. The term "edge computing" refers to a distributed computing paradigm that brings computation and data storage closer to a location in which it is needed. Unlike cloud computing, edge computing runs most operations on a local device without a remote connection to a central server. As a result, in general, edge computing is able to produce much quicker computing results than cloud computing.

Mobile device 12 is equipped with an image sensor 14, a processor 16, a memory 18, and, optionally, a display 20. Generally, these components of mobile device 12 have conventional characteristics. Image sensor 14 is any image sensor suitable for capturing images of a scene for purposes of object detection. The image sensor 14 may be, for example, an RGB image sensor, an infrared image sensor, a CCD image sensor, or a CMOS image sensor. Processor 16 includes circuitry for executing computer readable program instructions stored on the memory. Memory 18 is a non-transitory storage medium having stored thereon code instructions that, when executed by processor 16, causes performance of various steps. The storage medium may be, for example, an electronic storage device, a magnetic storage device, an optical storage device, a semiconductor storage device, or any suitable combination of the foregoing. In particular, the functions described herein may be performed on an application, or an "app," installed on the mobile device 12.

Display 20 may be any standard screen or display suitable for implementation in a mobile computing device, such as LCD, OLED, AMOLED, Super AMOLED, TFT, or IPS. In addition or alternatively, display 20 may be or include a wearable holographic projection headset. An example of a suitable headset is the Hololens® mixed reality headset manufactured by Microsoft.

The display 20 and processor 16 must have the technical capacity to support all of the technical functions described below, including, for example, evaluation of a three-dimensional scene, holographic projection, augmented reality, and ray-casting. These capabilities are typically found in tablet computers and mobile phones that include suitable hardware. In some cases, the image sensor 14 may also include depth-sensing capabilities, e.g. using Lidar, which enables improved 3D capture of a scene, leading to faster and more accurate SLAM tracking needed for augmented reality.

Mobile device 12 is further equipped with a communications module for wirelessly communicating with the cloud, for example, via a Bluetooth or wireless internet connection. This wireless connection is used, inter alia, for downloading software updates, including updates to the deep neural networks disclosed herein.

Memory 18 includes a program for generating and tracking SLAM 3D location markers for objects, and running a deep neural network for object identification from images. The deep neural network may have any architecture that is known or that may become known for performing object recognition, such as a fast-CNN architecture, or a YOLO architecture.

Optionally, the deep neural network is a hierarchical system of multiple neural networks. The hierarchical system uses hierarchical choice algorithms, based on inference results and spatial awareness information. The hierarchical system is used to reduce computing resources required to identify objects, by narrowing the number of items in a class. Thus, for example, instead of identifying a product from among every product in a store, which requires selection of one object out of thousands or tens of thousands, the deep neural network first selects the shelf or type of product that is being viewed (for example, toiletries or shampoos). After the shelf is selected, a second deep neural network selects the brand of product (for example, Pantene®), coupling its selection to the same product instance based on the SLAM 3D tracking of it in the scene (as will be discussed further herein). After the brand of product is selected, a final deep neural network selects the particular product that is depicted (for example, Pantene® Pro-v Classic Clean shampoo). In addition to identifying products based on visual properties such as shape, color, and text of packaging, the deep neural network may also be trained to read and identify bar codes, in a manner known to those of skill in the art.

In exemplary embodiments, there are hundreds of micro-deep neural networks stored on each mobile device. This configuration of the deep neural networks as micro-networks optimizes the speed of the offline training and real-time running of each model, the ability to adapt each model to a specific store, and the memory required to store each deep neural network on the mobile device 12.

Typically, all of the neural networks relevant to a given location are stored on the memory of each mobile device 10. In exemplary embodiments, deep learning networks able to identify 50,000 products are stored in 2 GB of a mobile device's memory. Because the mobile device is preloaded with all neural networks relevant to a location, it is able to function completely autonomously, as an edge computing device. Nevertheless, because deep-neural networks are memory-intensive, and in view of current memory limitations of mobile computing devices, it may not be possible to store deep neural networks relevant to all products in active short-term memory (i.e., RAM) of the mobile device.

Accordingly, in exemplary embodiments, a select number of deep neural networks relevant to particular shelves are uploaded onto the mobile device's short-term memory at any given time. For example, if the user wishes to image shelves containing shampoos, the user pre-fetches, in advance, all deep neural networks relevant to those products from the mobile device's long-term memory onto the short term memory of mobile device 12.

Memory 18 may also include a floor plan. The floor plan may include a representation of layout of shelves on a floor of a retail establishment, and a general description of the contents of the shelves (for example, shampoos, potato chips, or cereals). The floor plan 24 may optionally include a planogram, namely a three-dimensional representation of the layout of products on each of the shelves.

System 10 may also include a central management system 22. In exemplary embodiments, central management system 22 is a cloud-based product, such as Google® Cloud Platform, running on a virtualized machine. Alternatively, central management system 22 is a physical computer. The same deep neural networks and floor plan that are stored on the memory 18 of mobile devices 10 may also be stored on a memory 26 of the central management system 22.

Central management system 22 further includes a dashboard-style computer program 24 for aggregating and managing the results of the inventory tracking performed by each of the mobile devices 12 at each shelf. In exemplary embodiments, when a mobile device 12 is used to scan shelves, the mobile device 12 stores results and data of the scan on memory 18 of the mobile device. When mobile device 12 is connected to the internet, the mobile device 12 transfers the results and data to a cloud-based virtual machine on which the dashboard-style program 24 is stored.

Figure 2:
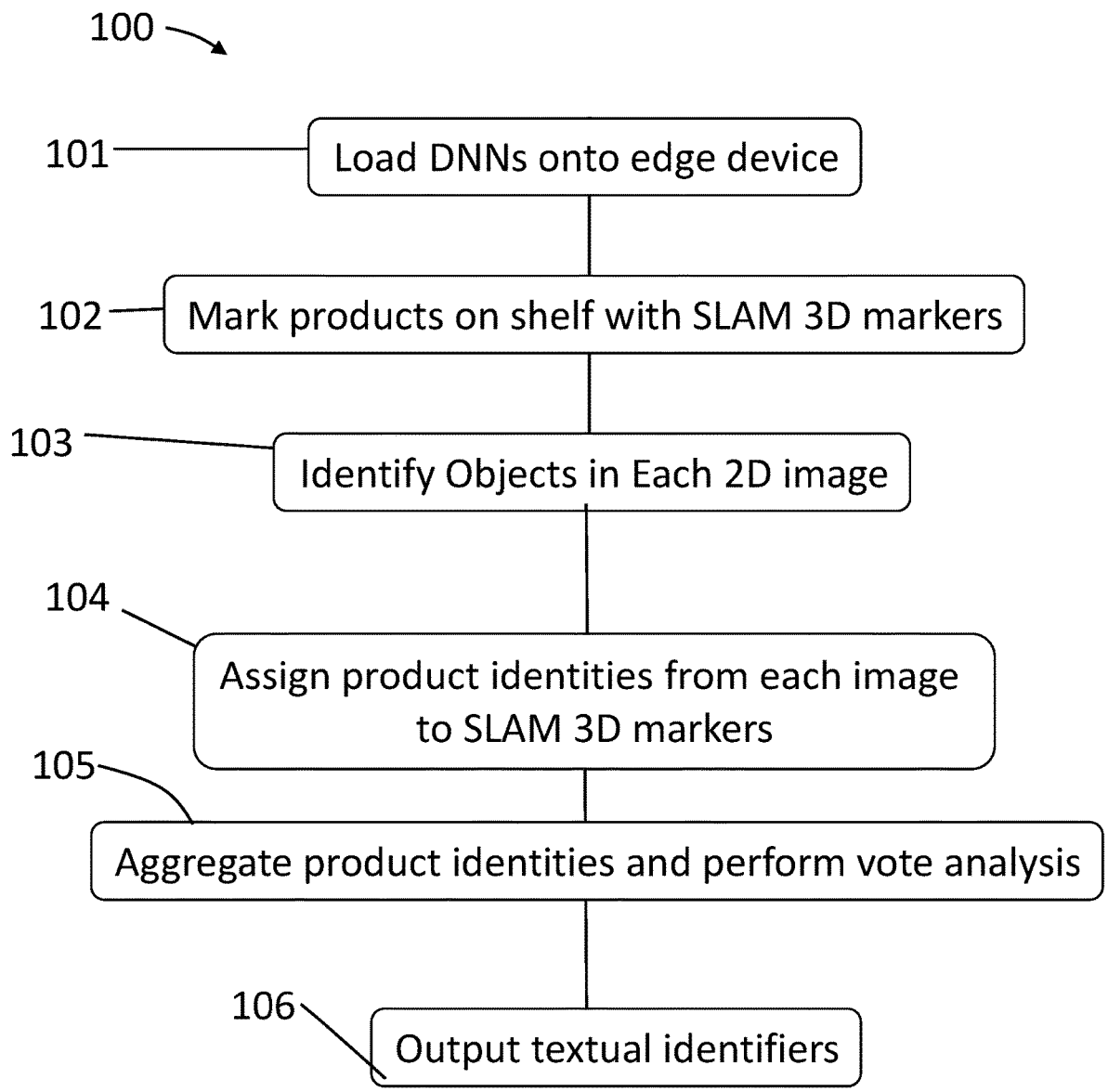
FIG. 2 depicts a flow chart illustrating a method for using SLAM 3D to optimize performance of a deep neural network, according to embodiments of the present disclosure.

FIG. 2 lists steps in a method for recognizing and tracking products in an inventory, and FIGS. 3A-6C depict illustrations of various steps in this method.

At step 101, the deep neural networks are loaded onto the mobile device 12. As discussed above, the deep neural networks are stored on the mobile device, so that the mobile device is able to perform the subsequent steps as an edge computing process. This loading may be done well in advance of scanning any particular shelf. In addition, prior to scanning any particular shelf, the deep neural networks relevant to the products on that shelf are loaded into short term (RAM) memory of the mobile device 12. This is typically performed in close proximity to the subsequent steps.

At step 102, the processor marks products on the shelf with simultaneous localization and mapping in 3 dimensions (SLAM-3D) markers. This SLAM 3D marking may be performed using conventional methods. For example, referring to FIG. 3A, the processor may receive multiple images of shelf unit 200. Shelf unit 200 has shelves 210, 220, and 230, with different products 212, 214, 216, 222, 224, 226, 232, 234 on the shelves 210, 220, 230. The processor executes a SLAM 3D program continuously on all the images, along with motion sensor data concurrently recording with each image. Examples of SLAM 3D programs suitable for carrying out the identification process described herein include ARKit® for Apple® operating systems, ARCore® for Android® operating systems, and ARFoundation as an abstraction layer for running ARKit or ARCore within Unity engine apps. The SLAM 3D program generates a plurality of bounding boxes. Each bounding box represents a product from the inventory whose three-dimensional location is to be tagged and tracked. For example, at FIG. 3B, bounding boxes 242, 244, 246, and 248 are drawn around certain of the products. The bounding boxes may be two-dimensional, as shown, or three-dimensional. Optionally, the bounding boxes may be displayed to the user. However, this is not necessary, and it is sufficient that the bounding boxes be stored as data points in three-dimensional space.

Notably, the bounding boxes are derived from the received images of the shelf, rather than from a 3D depth sensor. The algorithm for determining the bounding boxes may use an approach similar to that used by the human brain to derive depth from a monocular view. In particular, the algorithm may rely on 1) the parallax between objects at different depths when they are imaged from different perspectives in three-dimensions; and 2) the location of the products and points of contact thereof with the shelves, whose height and depth are generally known and may be incorporated into software for the 3D mapping. The 3D mapping may also incorporate deep learning models able to determine the depth of an item based on its appearance in images.

The bounding boxes are used for aggregating identifications of products from deep neural networks applied on two-dimensional images, as will be discussed further herein. The bounding boxes are also used for persistent capturing and reloading of 3D positions, for example, upon return visits to the same shelf, as will be discussed further herein.

Figure 3A:
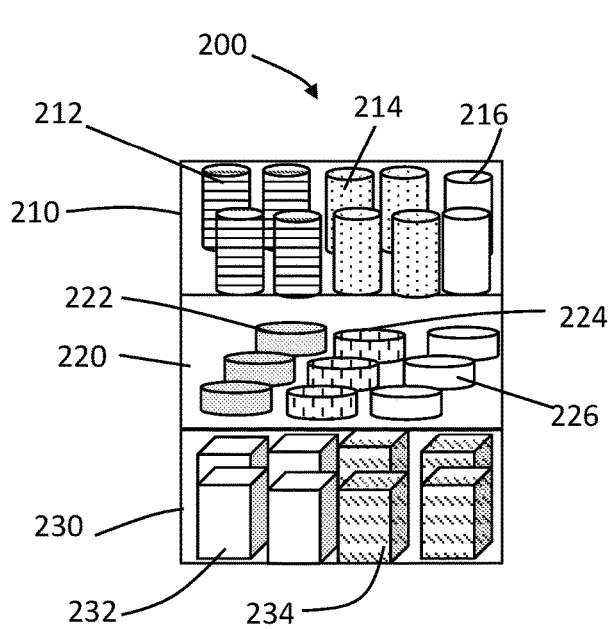
FIGS. 3A-3C schematically depict a process of SLAM 3D marking of objects in three-dimensional space, according to embodiments of the present disclosure.
Figure 3B:
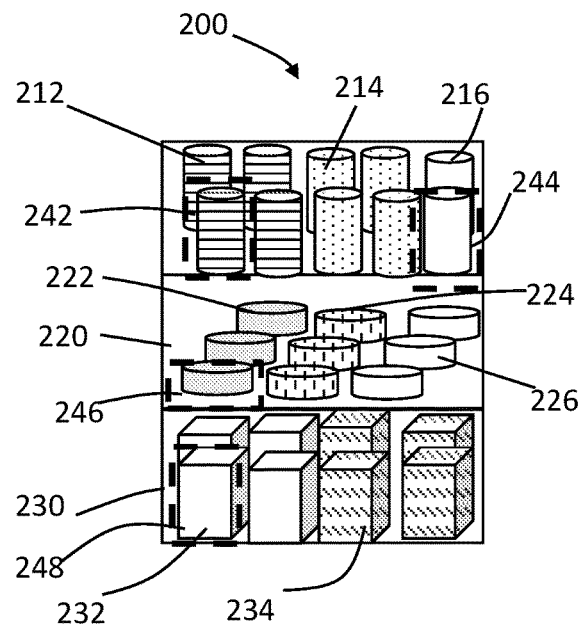
Figure 3C:
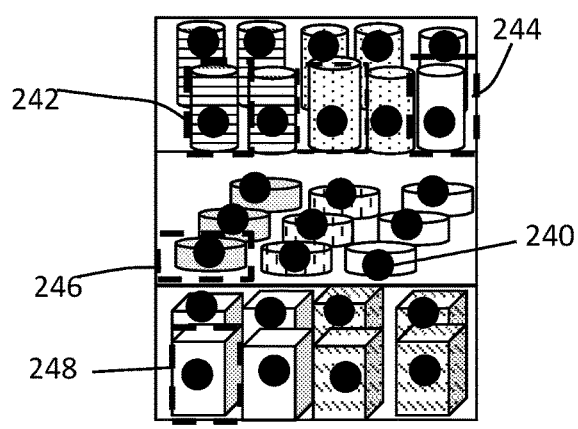

Still referring to step 102, and as shown in FIG. 3C, the SLAM 3D program also assigns a persistent marker 240 to each product. The persistent marker is also referred to herein as a spatial anchor. The persistent marker may be portrayed to the user as a holographic image overlaying the product on the screen, as shown in subsequent Figures. Alternatively, the persistent marker may simply be a data point without an accompanying graphical representation.

At step 103, the processor identifies various objects in the 2D images. As part of this process, and as depicted in FIG. 4A, the processor defines bounding boxes, such as bounding boxes 252, 254, 256, 258, around each of the products on the shelf. This process is also referred to herein as object localization.

The processor then identifies a product contained within each localized object. This identification may proceed, for example, through detecting a barcode on the product, or an SKU number. Typically, the identification is performed through application of a hierarchical deep neural network. In some embodiments, the first level of the hierarchical deep neural network is identification of the shelf or type of product, from among a selection of shelves on a floor plan. In such cases, the entire floor plan 24 is uploaded onto the active memory of mobile device 12 in advance of operation. In other embodiments, the type of shelf or product is pre-selected, so that the deep neural network proceeds with identification of brand and specific products.

Because the images used to identify the different products are taken from different angles, the perspective of the image may be used as part of the product identification process. For example, the processor may use estimated 3D shelf angle, distance to the shelf, and illumination—which are derivable from the 3D mapping—as an additional signal for the deep neural network, or in order to align the input images for the deep neural network. Such alignment may be performed using image processing, geometric manipulations, and transformations, also based on generative adversarial neural networks (GAN).

Following completion of step 103, every product on the shelf is identified. The processor assigns product identities to each of the identified products in the image. The product identities are typically a textual identification including the SKU code, brand name and product name. For example, as seen in FIG. 4A, the product in bounding box 252 is assigned label 251*a*, identifying it as XYZ shampoo 1, with "XYZ" being the brand and "shampoo 1" being the product type. The product in bounding box 254 is assigned label 253*a*, identifying it as XYZ shampoo 2; the product in bounding box 256 is assigned label 255*a*, identifying it as ABC can 1, and the product in bounding box 258 is assigned label 257*a*, identifying it as DEF box 1. Although not illustrated in FIG. 4A, it is understood that each identical product is assigned the same textual label. For example, each of the four products 232 is assigned a textual label "DEF box 1," while having a different persistent 3D marker.

At step 104, the processor associates each product identity from each two-dimensional image with the corresponding bounding box of the SLAM-3D mapping. As a result, following this step, the mobile device has stored therein the 3D locations of objects, whose contours are delineated with bounding boxes, and which have assigned thereto textual identifiers obtained through image processing. This association is schematically illustrated in FIG. 4C, which shows the products on the shelf having both the persistent markers previously shown in FIG. 3C, as well as the textual identifiers previously shown in FIG. 4A.

Referring now to step 105, theoretically, and as described above, it is possible to complete the identification of products based on evaluation of a single image. However, it is particularly advantageous, to perform the identification process simultaneously on multiple images of the same shelf, taken from different angles. In such embodiments, the processor applies the deep neural network on multiple images of the shelf captured from different angles. As a result, each SLAM-3D bounding box is associated with identifications from multiple corresponding images. These product identities are aggregated, and a voting analysis (e.g. even a simple majority-vote) is then applied to determine the correct identifier for the product.

This process is schematically illustrated by comparing FIG. 4B to FIG. 4A. FIG. 4B schematically illustrates operation of the product identification on a second view of the shelf unit 200. Sometimes the deep neural networks analyzing different images produce the same results, and sometimes they produce different results. For example, in the analysis of the scene illustrated in FIG. 4B, object 232 is identified with identifier 257*b* as DEF box 1, just like identifier 257*a*. However, other identifications are different. Identifier 251*b* indicates XYZ shampoo 2, as opposed to XYZ shampoo 1, and identifier 255*b* indicates ABC can 2 instead of ABC can 1. There is no identifier corresponding to identifier 257*a*; the perspective of the image did not provide a clear-enough view of that product to supply the basis for an identification.

By aggregating the different identifications for "n" views of the shelf, and applying a decision analysis to the aggregated identifications, the system is able to produce highly accurate results. Consider the aggregation of n identifications of the same product, in which each identification is estimated to have a reliability r of 80%. Assume further that a simple majority voting mechanism is applied, so that the product identification that is the most commonly selected is chosen, and the textual identifier corresponding to that product is output. As the number of iterations n increases, the probability p of reaching ground truth converges to 1, in the spirit of the Condorcet Jury Theorem. For the values given, using one iteration, the probability of the network being correct is 80%; for 3 iterations, ~90%; for 5 iterations, ~95%, and for 9 iterations, ~99%. Notably, these highly accurate results are achievable even with deep neural networks that are not particularly robust and that do not necessarily have high accuracy when operating on their own. For example, a deep neural network with only 70% accuracy for a single image reaches ~90% accuracy after just 10 iterations. In practice, many more images are captured and processed in real-time than 5-10, and thus the system is virtually guaranteed to select the correct identification.

The result of the "voting" analysis is illustrated schematically in FIG. 4C. As shown in FIG. 4C, the system has output textual identifiers 251, 253, 255, 257, respectively, each of which is indicated to be final.

Optionally, the system is configured to update the voting analysis continuously, as different images of the shelf are captured from different angles. The system may further be configured to display the continuously updating results of the voting analysis while the voting analysis is ongoing, although this is not required.

In the foregoing examples, the memory 18 is pre-loaded with information about all the products on the shelf, so that as soon as a product is identified, the memory is able to select the pre-stored textual identifier to match that product. In an alternative scenario, the processor is configured to identify a new product.

For example, the processor may identify a new product based on its barcode. The barcode may be read with a conventional barcode scanner connected to the mobile device 12, or with an image-processing implementation running on the mobile device 12. The mobile device may receive further information about the product associated with the barcode via a wireless network connection, for example from an enterprise resource planning (ERP) or inventory management system. The mobile device 12 then captures images of the new product, and associates the new images with the scanned barcode. These images form the basis for a classifier for identifying subsequent instances of the new product.

In addition to identifying new products, the processor is also capable of assigning new identifications of products to images. In particular, the processor is configured to apply a textual identification onto a corresponding image of the product associated with a 3D bounding box, in which the deep neural network was unable to identify the product from analysis of the image. Consider again FIGS. 4A-4C. The deep neural network, operating on the view of FIG. 4A, is able to identify object 216 as XYZ shampoo 2. From the view of FIG. 4B, however, the deep neural network was unable to identify the same object. Once the object is definitively identified as XYZ shampoo 2, based on the aggregated voting analysis, the processor "ray-casts" that identification onto all examples of that object in all the images. As a result, the system now learns that an object appearing like product 216, from the vantage point of the view of FIG. 4B, is XYZ shampoo 2.

Furthermore, the deep neural network may also recognize an object as an unidentified object. The SLAM 3D tracking may associate multiple images of the same unknown product instance on the shelf and annotate or "tag" them with the same textual identifier, for a later re-training of the deep neural network, which thus learns to identify the new product in later sessions. This identifier may be selected on the basis of the barcode scanning, as discussed above. Optionally, the identifier may be user-generated. For example, a user may assign a product identifier to a single product within a single image, from among the group of annotated unknown products. The processor then applies the user-generated identification to instances of said product in additional two-dimensional images.

FIGS. 5A-5C depict views of a mobile device performing steps 101-106 described above. FIG. 5A depicts a mobile device 310 scanning a shelf 400 full of shampoo products. The shampoo products are viewable on the display 318 of the mobile device, without any additions or enhancements. At FIG. 5B, the mobile device 310 has completed its 3D scanning of the shelf 400, and has applied persistent 3D markers 440 to each of the shampoo bottles on the shelf 400. The persistent 3D markers 440 are shown as holographic images overlaying the images of the shampoo bottles in the display. At FIG. 5C, in addition to the persistent markers 440a and 440b, each product has a textual identifier, for example textual identifier 441 that is projected on the screen. Also visible in FIG. 5C is an action box 449, through which the user may perform actions associated with updating the products on the inventory, as will be discussed further herein.

In the embodiments described above, the persistent 3D markers are overlaid onto the image of the shelf in the form of dots, with a single dot in front of each product. In alternative embodiments, the processor uses augmented reality technology to project continuously a portion of the shelf in front of the shelf, as will be described further herein.

Typically, steps 101-106 are completed within no more than 20 seconds after commencement of operation. This short time frame is a dramatic improvement from known systems, which typically require at least 10 minutes and up to 24 hours to perform similar work. One reason that the disclosed embodiments are able to achieve such improvements in speed is that all SLAM 3D marking and image processing is performed as an edge computing process on the mobile device. In addition, testing of systems 10 implemented according to the present disclosure have shown a 95-97% accuracy rate for identifying products within this short time frame of approximately 10-20 seconds.

Figure 6A:
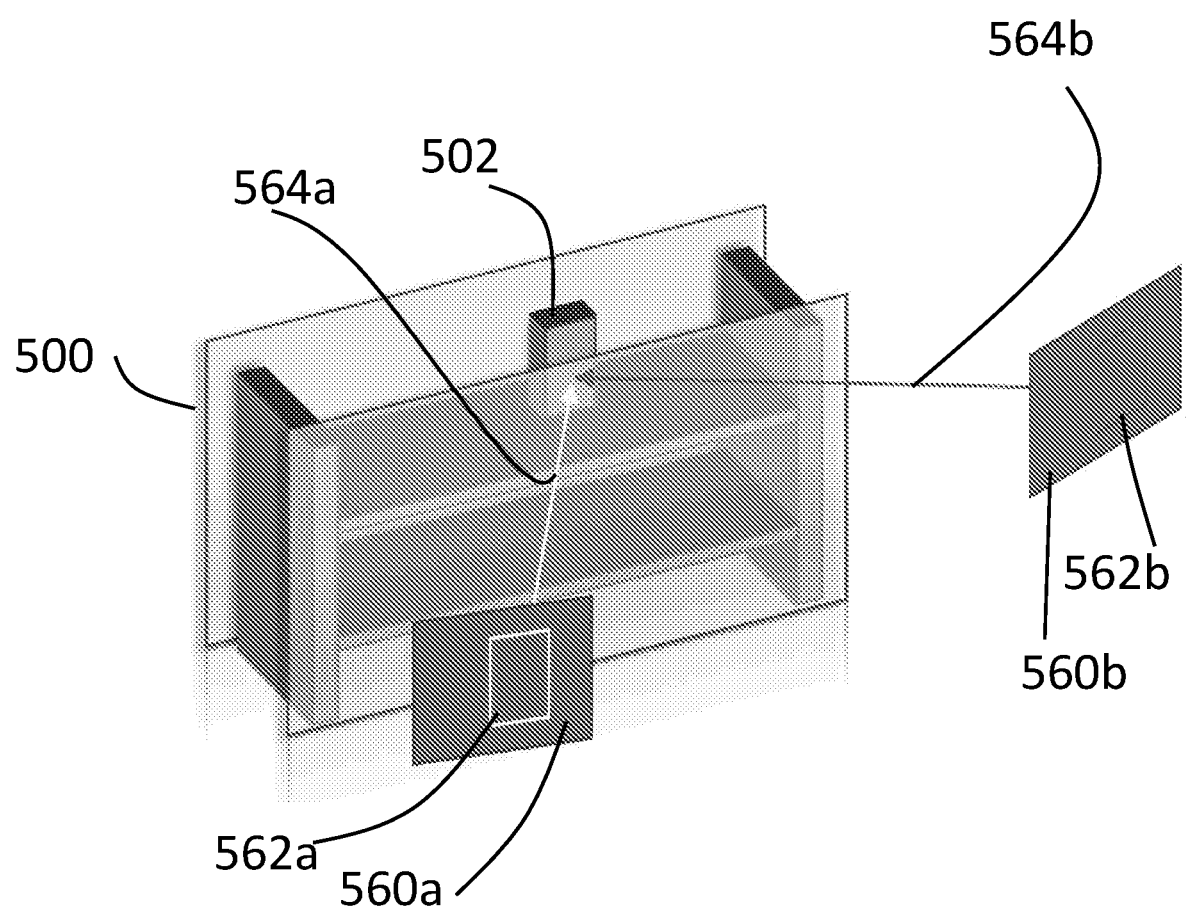
FIG. 6A schematically illustrates persistent identification of an object on a shelf as a mobile device is moved in three dimensions, according to embodiments of the present disclosure.
Figure 6B:
FIG. 6B illustrates holographic projection of contents of a shelf into an area in front of the shelf by image sensors imaging the shelf from multiple angles, according to embodiments of the present disclosure.
Figure 6C:
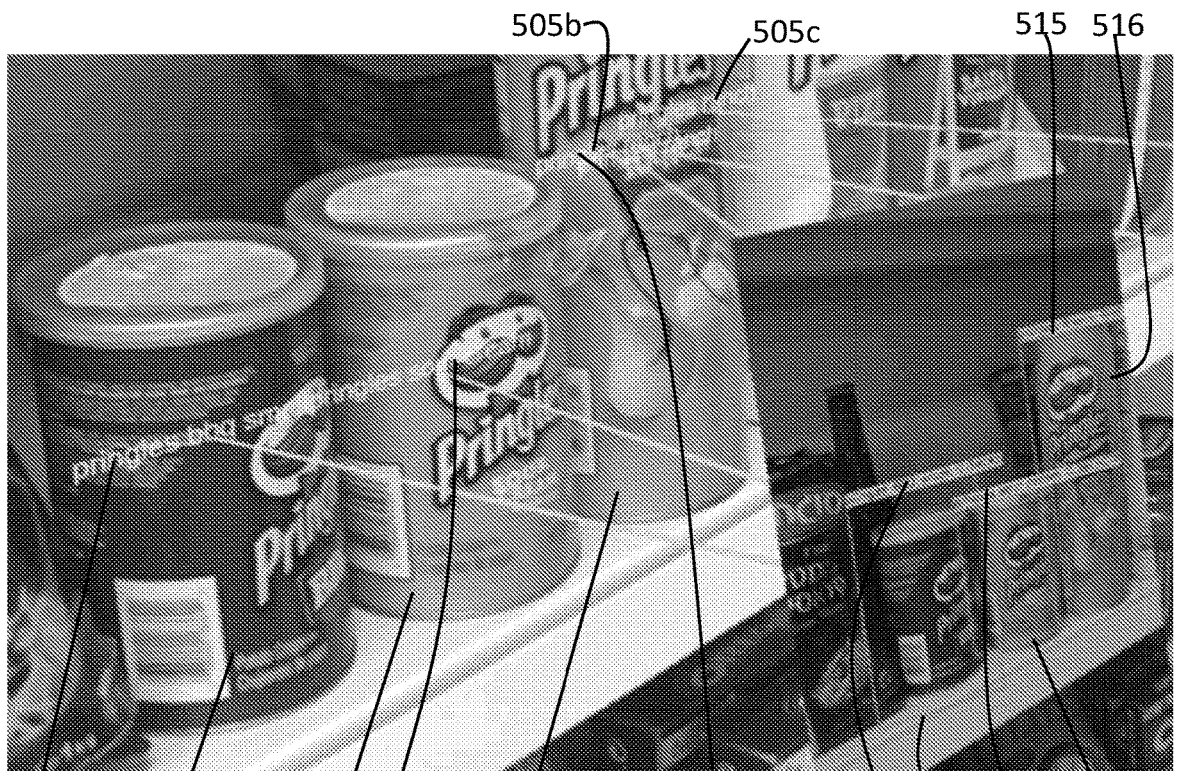
FIG. 6C is a close-up view of the illustration of FIG. 6B, showing ray-casting of textual identifications onto the products, from each of the vantage points of the image sensor.

FIGS. 6A-6C illustrate, in three-dimensions, the generation of two-dimensional images from different vantage points, the display of these images, and the use of the SLAM-3D markers and bounding boxes to maintain persistent identification of the products regardless of the location of the mobile device relative to the shelf.

FIG. 6A illustrates this projection of the bounding boxes when the mobile device is moved between different vantage points. FIG. 6A shows an augmented reality display shown by a mobile device of a product 502 on shelf 500. When viewing the shelf from the left, the mobile device displays holographic projection 560a in front of the shelf. Holographic projection 560a is a representation of a 2D image of the shelf taken from the left. The projection may include a bounding box 562a around an image of the product 502. The holographic projection 560a is placed such that, when extended to the shelf along vector 564a, the bounding box would demarcate the boundaries of product 502. When viewing the shelf from the right, the mobile device displays holographic projection 560b. Holographic projection 560b includes bounding box 562b, which, again, is placed so that when extended to the shelf along vector 564b, the bounding box 562b would delineate the boundaries of the product 502. Vectors 564a and 564b may be "ray-cast" onto the display as well, for ease of identification of the correlation by a user. The holographic projection thus remains visible on an image of product 502, regardless of the angle at which product 502 is viewed.

Thus, the holographic projections 560a and 560b are visible manifestations of the processes described above, and specifically, the association of SLAM 3D markers to corresponding sections of multiple images. This association enables the voting analysis used for highly accurate identification, as well as annotation of new views of images for which the deep neural networks were unable to provide a correct identification, as discussed above.

FIG. 6B illustrates a composite view of a shelf with multiple holographic projections 560a, 560b, and 560c. Each holographic projection depicts the products on the shelf as viewed by the mobile device at a corresponding vantage point. For example, in projection 560b, a white container is visible to the right; this container is not visible in holographic projection 560a. FIG. 6C is a close-up view of the portion of FIG. 6B that is within the dashed rectangle. As can be seen in this view, projection 560a includes a bounding box 512, 514, 516 around each product. Projection 560a also includes a textual identifier 511, 513, 515 for each product. Each textual identifier is ray-cast onto the corresponding product in the 3D scene. When a product is captured in more than one view, a 2D image of that product is shown with multiple textual identifiers ray cast therein. For example, container 505a has the text "pringles ranch" ray cast three times onto it, one from each of the holographic views depicted in FIG. 6B.

The processor uses the new product identifications from the two-dimensional images to optimize the deep neural networks. In contrast to a conventional deep neural network, whose training is completed on images having known ground truths before it identifies unknown images, the deep neural networks of the disclosed embodiments are continually exposed to new images suitable for training. This is because, due to the persistent identification of objects in subsequent 2D images through association with the 3D markers, each product in a subsequent 2D image is identified. Thus, no matter the angle from which the object is viewed, or the percentage of the product that is visible from that angle, the product is always identifiable. The new views of the product may thus be saved and incorporated into a classifier used for the training of the deep learning network. This capacity of the deep neural network for autonomous self-learned image annotation eliminates the need for "human in the loop" annotation of new images for the deep learning network. In addition, because the deep neural network is capable of self-learning, it is possible to train the deep neural network with just a few images per product, and then to supplement the training with the newly-generated views.

Optionally, this updating of the training of the deep neural network may take place on a central management system rather than the mobile devices themselves. That is, the additional images and identifiers are uploaded to the central management system 22, and the central management system 22 updates the relevant deep neural networks, and transmits updated versions of the deep neural networks back to the mobile devices. This updating may occur during a period when the mobile device is not otherwise in use, for example overnight. Due to this capacity for revising the training of the network, subsequent applications of the network for object identification (e.g., to identify products on previously unseen shelves) are more accurate than previous applications.

When a floor plan 24 is uploaded into the mobile device 12, in addition to being used for persistent identification and improvement of the deep neural network, the 3D markers may be used for navigation. Specifically, as discussed above, as part of the first step of product identification, the mobile device identifies the shelf in front of which it is positioned.

When this identification is overlaid with the floor plan, the mobile device 12 is able to provide directions to any other location on the floor plan. These directions may likewise be projected onto the screen 20 in augmented reality, for example, over the images of aisles and shelves.

Figure 7:
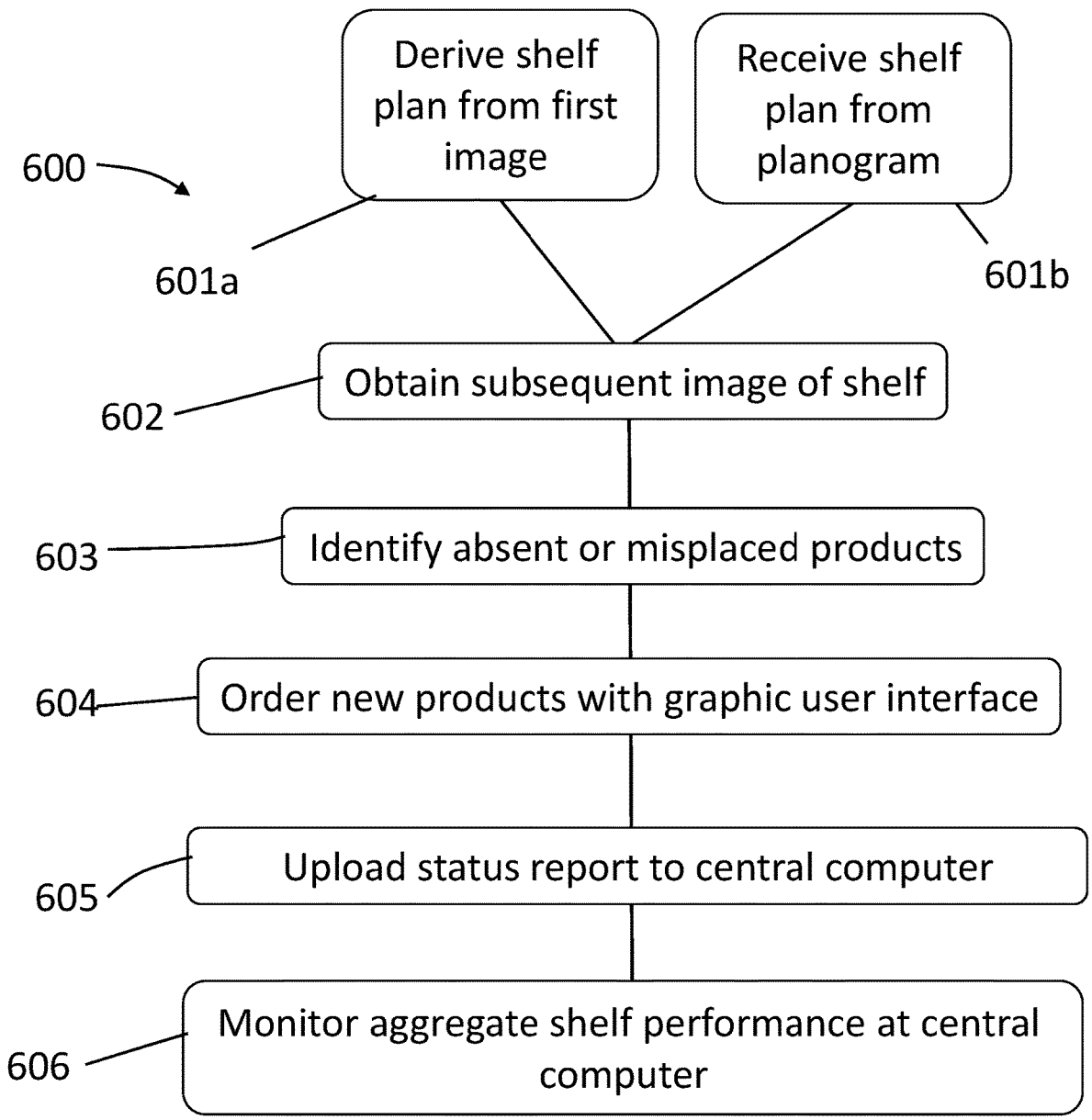
FIG. 7 depicts a flow chart illustrating a method for tracking inventory, according to embodiments of the present disclosure.

Referring now to FIG. 7, the system and method described above may be used in a method 600 for monitoring and controlling inventory. FIGS. 8A-8C and 9A-9B depict examples of graphic user interfaces for carrying out the method described in FIG. 7.

At step 601a, the processor 16 derives a shelf plan from a first scan, or imaging session, of a shelf. This first scan is used as a baseline against which subsequent statuses of the shelf are to be compared. Thus, in certain respects, the first scan of the shelf is akin to a planogram. However, unlike a conventional planogram, which is prepared "offline," in a theoretical manner, the baseline generated in step 601a is based on actual arrangement of a shelf. In addition, the shelf plan derived in step 601a is derived as part of an edge computing process. It is not necessary for the mobile device 12 to be connected to a network at all when generating the shelf plan.

Alternatively, at step 601b, the processor 16 receives a shelf plan from a planogram.

At step 602, the user obtains a subsequent image of a shelf. For example, a user may return to the shelf a day after running the first scan or receiving the planogram and generating the shelf plan, to evaluate the status of inventory on the shelf.

At step 603, the processor identifies absent or misplaced products. The processor does this by comparing the "realogram", i.e. the actual final 3D locations of the products, as inferred from the current scan of the shelf, with the "planogram", i.e. the 3D marker positions showing expected locations of products on the shelf. The processor then modifies its display of the holographic markers corresponding to each of the products, depending on the status of that product.

Advantageously, this comparison and identification is performed as an edge-computing process, effectively in real time, as the mobile device scans the shelves. Known systems for comparing actual shelf setup to prior setups require sending images to be processed to a central computer via the cloud. This process may take several minutes. By contrast, the comparison and identification according to the described embodiments is completed in just a few seconds, as an edge computing process.

Figure 8A:
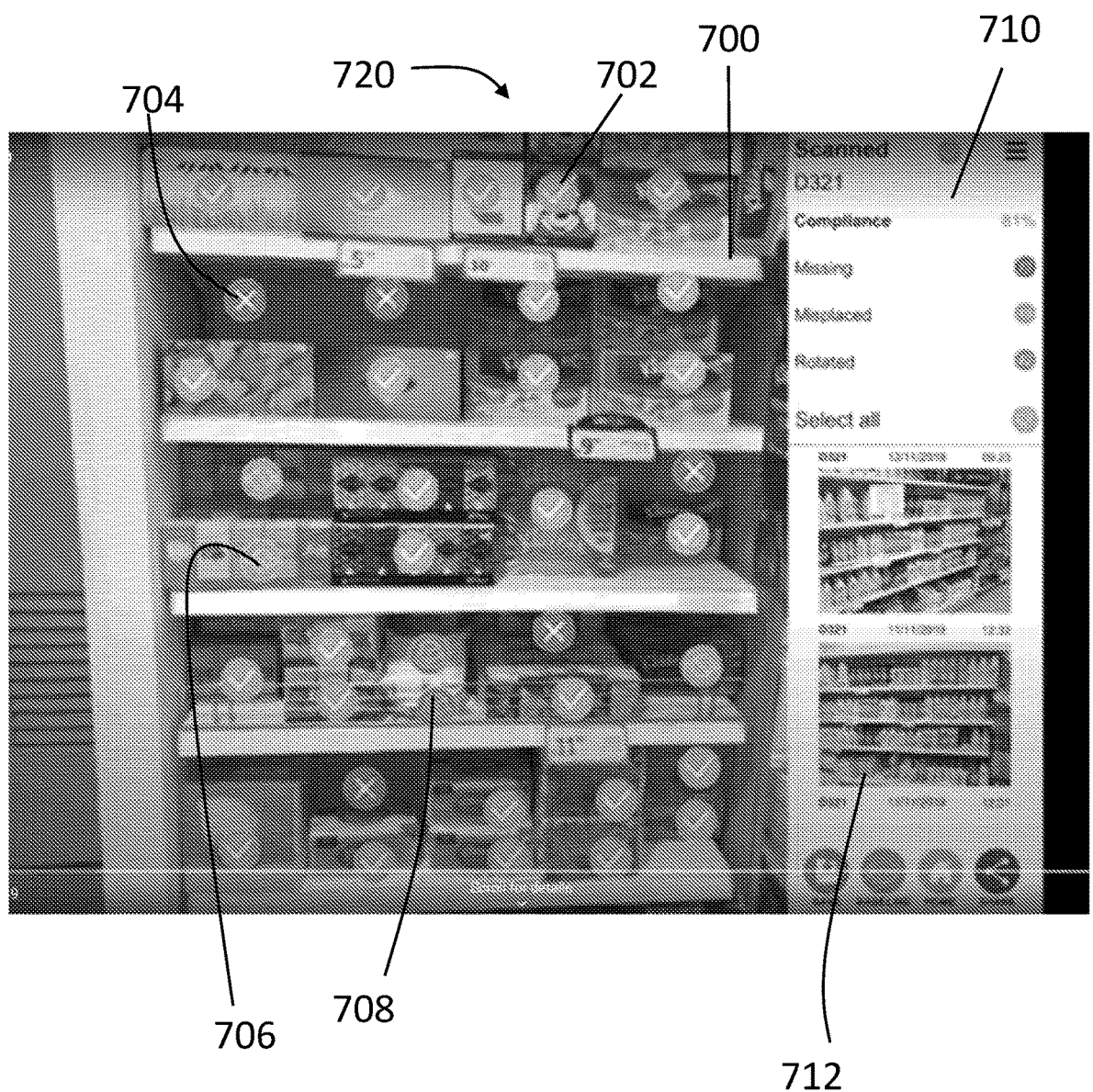
FIG. 8A illustrates a graphic user interface for comparing present conditions on a shelf with previously recorded conditions, according to embodiments of the present disclosure.
Figure 8B:
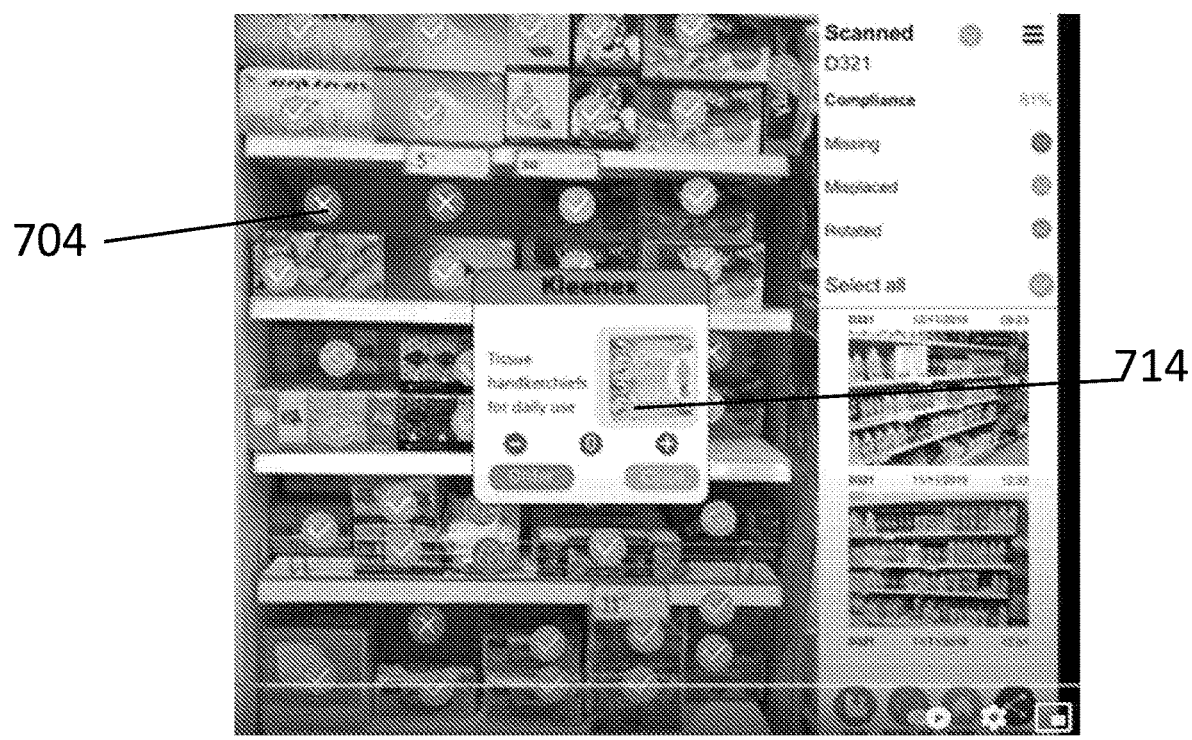
FIG. 8B illustrates the graphic user interface of FIG. 8A with a prompt to a user to order additional inventory, according to embodiments of the present disclosure.
Figure 8C:
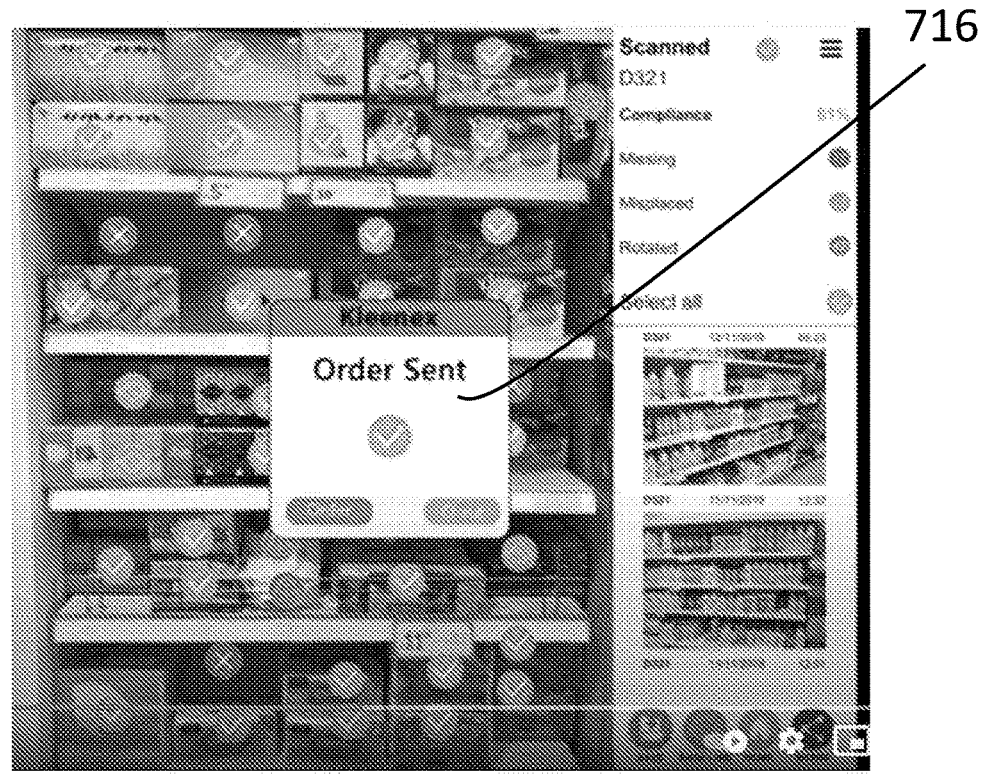
FIG. 8C illustrates the graphic user interface of FIG. 8A with an indication that ordering additional inventory has been completed, according to embodiments of the present disclosure.

FIG. 8A depicts an exemplary graphic user interface 720 showing results of the identification performed at step 603. Each of the products on the shelf is given one of four holographic identifiers: "check" mark 702, indicating that the product was scanned and found to be present in the right location and the right orientation; "null" mark 704, indicating that the product is absent; "eye" mark 706, indicating that the product is misplaced; or "rotation" mark 708, meaning that the product is misaligned. Each of these markers may be in a different color, for ease of reference. In addition to marking each product location on the shelf, the graphic user interface 720 includes an aggregate shelf compliance summary 710. The shelf compliance summary includes, inter alia, a shelf identifier (such as "D321", in the present example), and a shelf "score" representing the percentage of products that are present and correctly situated (81%, in the present example). The graphic user interface 720 also includes a comparison region 712, showing images from previous scans of the same shelf, marked with the dates and times of those scans.

Optionally, the graphic user interface may also display a calculation of how much time would be required to restore the shelf to its initial state. The system may further include an algorithm for calculating the minimal number of steps necessary to convert the present state of the shelf (realogram) to the original or desired state of the shelf (planogram), and correspondingly an output to the user of the recommended sequence of steps to take to achieve this conversion. In exemplary embodiments, the recommendation of how to achieve the conversion is determined with a sequence alignment algorithm. Sequence alignment algorithms are used in bioinformatics to evaluate differences between long strands of DNA. The order of products on a shelf may be analogized to an order of nucleotides, for purposes of applying the algorithm. For example, suppose that a group of four products is placed in the correct order on a shelf, but is displaced. In theory, this displacement results in four consecutive errors. However, because the algorithm recognizes the sequence, it is able to determine that it would be more efficient to simply move the sequence of products down the shelf, as opposed to replacing each product.

At step 604, when there is a discrepancy between the current state of the shelf and the initial state, the user may order new inventory, directly from the graphic user interface depicting the comparison. To enable ordering the new inventory, the mobile device is integrated with an inventory management or enterprise resource planning (ERP) system used by the retail establishment. For example, referring to FIG. 8B, selection of one of the markers (e.g., marker 704) calls up a prompt 714. The prompt 714 may include, for example, a name of a product ("Kleenex®"), an image of the product, a description of the product ("Tissue handkerchiefs for daily use") and a series of buttons for selecting a number of boxes to order and executing the order. Optionally, the prompt may include a specific recommendation of how many boxes to order. At FIG. 8C, following execution of the order, the graphic user interface shows a confirmation screen 716 indicating that the order was sent. Of course, instead of using the mobile device 12 to order the new inventory, the user may also address the inventory needs in a low-tech fashion, for example by manually fetching and shelving the new products.

The augmented reality prompts may also be used for other purposes, in addition to ordering new products. For example, augmented reality communications may be sent to employees, including, for example, product-specific notes, instructions, and real-time remote assistance.

At step 605, the mobile device 12 communicates information regarding each shelf to the central computer 22. At step 606, the user monitors aggregate shelf performance at the central computer 22.

Figure 9A:
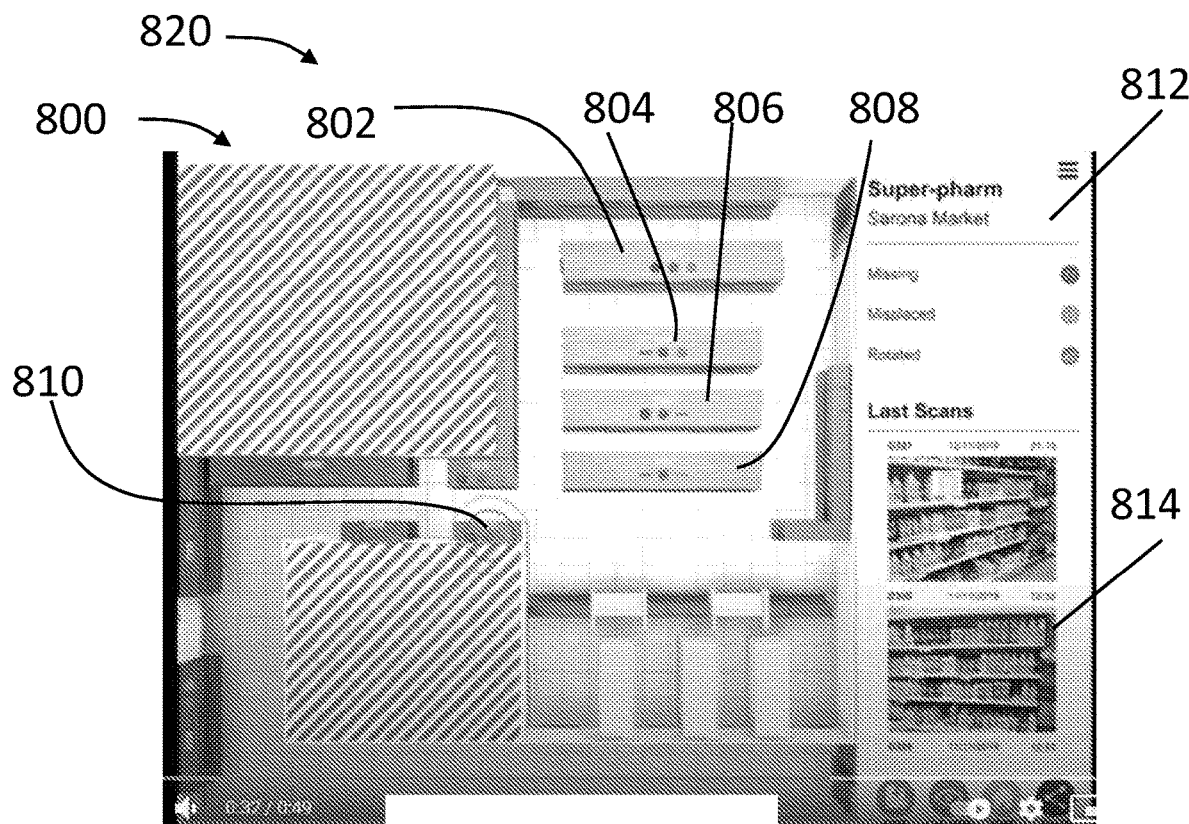
FIG. 9A depicts a graphic user interface for monitoring inventory status of various shelves in a retail establishment, according to embodiments of the present disclosure.
Figure 9B:
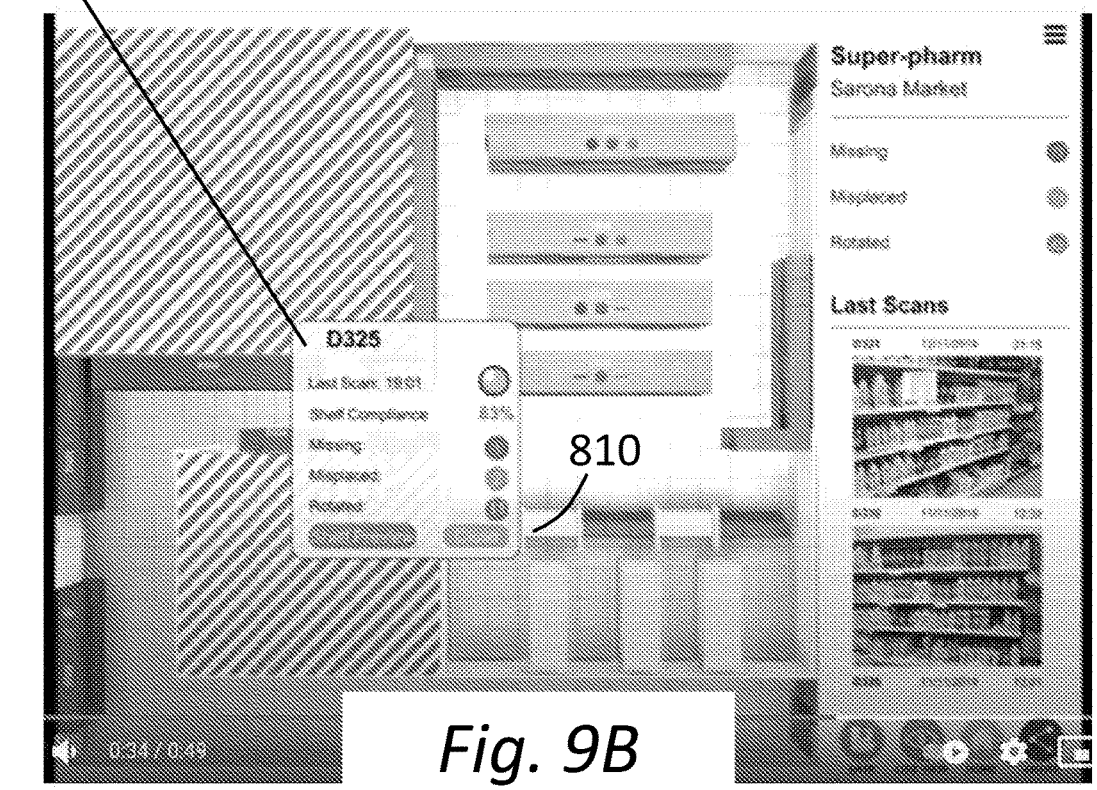
FIG. 9B depicts the graphic user interface of FIG. 9A with information about a particular shelf highlighted, according to embodiments of the present disclosure.

FIGS. 9A and 9B illustrate exemplary graphic user interfaces for aggregate monitoring of a store floor plan in a "dashboard" view, according to embodiments of the present disclosure. Referring to FIG. 9A, graphic user interface 820 includes a schematic view of floor plan 800. Within floor plan 800 are individual shelves 802, 804, 806, 808, 810. On top of each shelf are three indicators, corresponding to "missing" items, "misplaced" items, or "rotated" items. The indicators may be round, indicating that there are such missing, misplaced, or rotated items, or flat, indicating that there are none. The graphic user interface 820 further includes a summary section 812. The summary section 812 includes the name of the store and the cumulative number of missing, misplaced, and rotated items on all the shelves. The graphic user interface may further include a collection 814 of the most recent images scanned by the mobile devices. Each shelf is selectable for display of more information about that particular shelf. For example, in the view of FIG. 9A, a user is preparing to select shelf 810, as illustrated by the "bulls-eye" appearing on top of the shelf. At FIG. 9B, the user has selected shelf 810, to reveal a status box 814. Status box 814 includes an identifier for the shelf (for example, "D325"), a time of the last scan, a cumulative shelf compliance score, the number of missing, misplaced, and rotated products, and a button for calling up a preview image of the shelf.

The aggregate monitoring of the shelves may also include other analyses relevant to store management, such as quantity of sales, effective deployment of sales staff, comparison of the actual shelf setup with a planogram, and recommendations for changing the floor plan or planogram of each shelf in order to maximize sales.

In addition to the dashboard being organized according to the store layout, the dashboard may be organized based on other data, such as employee, product stock keeping unit (SKU), shelf, chain store, etc. The dashboard may also present more elaborate statistical analytics of the collected data as well as predicted trends of various retail-relevant parameters.

Optionally, the aggregate monitoring may also be used to direct subsequent scanning of shelves. For example, because the central computer stores the time of the last scan of each shelf, the central computer may identify priorities regarding which shelves should be scanned next. These priorities may be communicated to the mobile device in the form of a task list, in order to instruct the user (e.g., a store employee) which shelves to scan. When the employee completes a scan on the task list, he or she marks that task completed.

The augmented reality features described herein may be implemented in other aspects of the retail experience. For example, augmented reality markers of products in the store may be integrated with augmented reality headsets worn by shoppers. This, in turn, may support continuous updating of products selected by shoppers, enabling a seamless self-checkout process. The augmented reality headsets or devices used by shoppers may also enhance the shopping experience in other ways. For example, augmented reality prompts may be used to show shoppers information about products and recommendations for product usage. Data from the headsets may also serve as a form of crowd-sourcing of the stock data, and training images collected usually by auditors, as described in the aforementioned embodiments.

What is claimed is:

1. A system for identifying and tracking of an inventory of products on one or more shelves, comprising a mobile device including:
    an image sensor;
    at least one processor; and
    a non-transitory computer-readable medium having instructions that, when executed by the processor, causes the processor to perform the following steps:
    apply a simultaneous localization and mapping in three dimensions (SLAM 3D) program, on images of a shelf input from the image sensor, to thereby generate a plurality of 3D-mapped bounding boxes, each 3D-mapped bounding box representing a three-dimensional location and boundaries of an unidentified product from the inventory;
    capture a plurality of two-dimensional images of the shelf;
    assign an identification to each product displayed in the plurality of two-dimensional images using a deep neural network, wherein the deep neural network is a hierarchical system of multiple neural networks running dependently in a sequence;
    associate each identified product in a respective two-dimensional image with a corresponding 3D-mapped bounding box,
    repeat the assign and associate steps on a plurality of images of the shelf captured from different angles, to thereby generate a plurality of identifications of products associated with each 3D-mapped bounding box;
    aggregate the plurality of identifications associated with each 3D-mapped bounding box; and
    apply a voting analysis to the aggregated identifications to thereby determine an identification of the product in each 3D-mapped bounding box,
    wherein the mobile device comprises a long-term memory for storing each hierarchical deep neural network for each shelf on a floor plan, and the processor is further configured to upload deep neural network levels for identification of products on a particular shelf to a short-term memory of the mobile device in advance of imaging of said shelf, so that the identification is performed solely as an edge computing process.

2. The system of claim 1, wherein the processor is further configured to continuously update the voting analysis as additional images of the shelf are captured from different angles.

3. The system of claim 1, wherein the hierarchical system of multiple neural networks includes: a first level for identifying a shelf or a category of product; a second level for identifying a brand; and a third level for identifying a specific product.

4. The system of claim 1, wherein the processor is further configured to cast an identification of a 3D-mapped bounding box resulting from the voting analysis onto a corresponding image of the product at the 3D location of the 3D-mapped bounding box, to thereby provide an identification of the product in the corresponding image even when the deep neural network was unable to identify said product.

5. The system of claim 4, wherein the processor is further configured to update training of the deep neural network based on said casting of the identification.

6. The system of claim 4, wherein the processor is further configured to receive a user-generated identification of a product within a particular image; and apply said user-generated identification to instances of said product in additional two-dimensional images.

7. The system of claim 1, wherein the processor is further configured to apply a persistent 3D marker onto products on the shelves to thereby maintain persistent identification of products within discrete regions of a three-dimensional scene, in real time, as the image sensor changes its vantage point relative to the shelf.

8. The system of claim 7, wherein the mobile device further comprises a screen, wherein the system is configured to display on the screen a holographic projection overlaying each product on the shelf, said holographic projection remaining visible on an image of each product regardless of an angle at which each product is viewed.

9. The system of claim 1, wherein the processor is configured to identify a product based on a bar code printed on a packaging of the product.

10. The system of claim 1, wherein the memory further comprises a floor plan encompassing a plurality of shelves, and the processor is configured to identify a shelf imaged with the image sensor from among the plurality of shelves of the floor plan.

11. The system of claim 10, wherein the processor is further configured to provide instructions regarding how to reach a selected location on the floor plan, based on the processor's identification of a current shelf location and the floor plan.

12. The system of claim 1, wherein the processor is further configured to monitor changes in the inventory over each shelf based on a comparison of the 3D-mapped bounding boxes with either a memorized scene of three-dimensional bounding-boxes taken at a prior time or with a planogram previously uploaded to the mobile device.

13. The system of claim 12, wherein the mobile device comprises a screen, and is further configured to display on the screen, at least one of (1) a status of the products of the shelf; (2) a recommendation to correct placement of products on the shelf, and (3) a recommendation to place additional products on the shelf.

14. The system of claim 13, wherein the system is configured to determine a recommendation to correct placement of products on the shelf based on a sequence alignment algorithm.

15. The system of claim 13, wherein the mobile device is further configured to display on the screen a graphical user interface including a button that, when selected, enables a user to place an order for new products.

16. The system of claim 1, further comprising a central physical or cloud-based computing system, wherein each mobile device is configured to communicate information about a present status of the shelf to the central computing system.

17. A method of identifying and tracking an inventory of products on one or more shelves, comprising the following steps performed on a mobile device:
applying a simultaneous localization and mapping in three dimensions (SLAM 3D) program on images of a shelf, to thereby generate a plurality of 3D-mapped bounding boxes, each 3D-mapped bounding box representing a three-dimensional location and boundaries of an unidentified product from the inventory;
capturing a plurality of two-dimensional images of the shelf;
assigning an identification to each product displayed in the plurality of two-dimensional images using a deep neural network;
storing on a long-term memory of the mobile device each hierarchical deep neural network for each shelf on a floor plan, and uploading, from the long-term memory of the mobile device to a short term-memory of the mobile device, deep neural network levels for identification of products on a particular shelf in advance of imaging of said shelf, so that the identifying step is performed solely as an edge computing process;
associating each identified product in a respective two-dimensional image with a corresponding 3D-mapped bounding box;
repeating the assigning and associating steps on a plurality of images of the shelf captured from different angles, thereby generating a plurality of identifications of products associated with each 3D bounding box;
aggregating the plurality of identifications associated with each 3D bounding box; and
applying a voting analysis to the aggregated identifications to thereby determine an identification of the product in each 3D-mapped bounding box.

18. The method of claim 17, further comprising continuously updating the voting analysis as additional images of the shelf are captured from different angles.

19. The method of claim 17, wherein the deep neural network is a hierarchical system of multiple neural networks running dependently in a sequence.

20. The method of claim 19, wherein the hierarchical system of deep neural networks includes a first level for identifying a shelf or a category of product, a second level for identifying a brand, and a third level for identifying a specific product.

21. The method of claim 17, further comprising casting an identification of a 3D-mapped bounding box resulting from the voting analysis onto a corresponding image of the product at the 3D location of the 3D-mapped bounding box, to thereby provide an identification of the product even when the deep neural network was unable to identify said product.

22. The method of claim 21, further comprising updating training of the deep neural network based on said casting of the identification.

23. The method of claim 22, further comprising receiving a user-generated identification of a product within a particular image, and applying said user-generated identification to instances of said product in additional two-dimensional images.

24. The method of claim 17, further comprising applying a persistent 3D marker onto products on the shelves and thereby maintaining persistent identification of products within discrete regions of a three-dimensional scene, in real time, while changing a vantage point of an image sensor of the mobile device relative to the shelf.

25. The method of claim 24, further comprising displaying on a screen of the mobile device a holographic projection overlaying each product on the shelf, and maintaining said holographic projection visible on an image of each product regardless of an angle at which each product is viewed.

26. The method of claim 17, further comprising identifying a product contained within each region based on a bar code printed on a packaging of the product.

27. The method of claim 17, further comprising identifying an imaged shelf from among a plurality of shelves encompassed in a floor plan.

28. The method of claim 27, further comprising providing instructions regarding how to reach a selected location on the floor plan, based on an identification of a current shelf location and the floor plan.

29. The method of claim 17, further comprising monitoring changes in the inventory over each shelf based on a comparison of the bounding boxes with either a memorized scene of three-dimensional bounding boxes taken at a prior time or with a planogram previously uploaded to the mobile device.

30. The method of claim 29, further comprising displaying on a screen of the mobile device at least one of (1) a status of the products of the shelf; (2) a recommendation to correct placement of products on the shelf, and (3) a recommendation to place additional products on the shelf.

31. The method of claim 30, further comprising determining a recommendation to correct placement of products on a shelf based on a sequence alignment algorithm.

32. The method of claim 31, further comprising displaying on the screen a graphical user interface including a button that, when selected, enables a user to place an order for new products.

33. The method of claim 17, further comprising communicating information about a present status of the shelf to a central physical or cloud-based computing system.

* * * * *